(12) United States Patent
Braun et al.

(10) Patent No.: US 8,469,451 B2
(45) Date of Patent: Jun. 25, 2013

(54) VEHICLE SEAT HAVING A ROTATABLE BACK PART

(75) Inventors: Jens Braun, Muehltahl (DE); Armin Rossmann, Mauchenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 382 days.

(21) Appl. No.: 12/738,561

(22) PCT Filed: Sep. 24, 2008

(86) PCT No.: PCT/EP2008/008065
§ 371 (c)(1),
(2), (4) Date: Apr. 16, 2010

(87) PCT Pub. No.: WO2009/052916
PCT Pub. Date: Apr. 30, 2009

(65) Prior Publication Data
US 2010/0244529 A1    Sep. 30, 2010

(30) Foreign Application Priority Data

Oct. 19, 2007   (DE) .......................... 10 2007 050 091

(51) Int. Cl.
*B60N 2/00* (2006.01)
*B60N 2/42* (2006.01)
*A47C 7/02* (2006.01)

(52) U.S. Cl.
USPC ............. 297/354.12; 297/452.18; 297/216.13

(58) Field of Classification Search
USPC ............. 297/452.18, 354.12, 216.13, 216.14
See application file for complete search history.

(56) References Cited

U.S. PATENT DOCUMENTS

| | | | |
|---|---|---|---|
| 3,583,762 A | 6/1971 | Strien | |
| 4,386,805 A | 6/1983 | Boisset | |
| 5,254,055 A * | 10/1993 | Kawakita et al. | 475/341 |

(Continued)

FOREIGN PATENT DOCUMENTS

| | | |
|---|---|---|
| DE | 1755333 C3 | 7/1971 |
| DE | 2001842 A1 | 7/1971 |

(Continued)

OTHER PUBLICATIONS

British Patent Office, British Search Report for Application No. GB1005189.4, dated Aug. 16, 2011.

(Continued)

*Primary Examiner* — David Dunn
*Assistant Examiner* — Tania Abraham
(74) *Attorney, Agent, or Firm* — Ingrassia Fisher & Lorenz, P.C.

(57) ABSTRACT

A vehicle seat, in particular for a passenger automobile, is provided having a seat part, a back part connected thereto so it is rotatable, and a fitting for adjusting the angle between seat and back parts. The fitting including, but not limited to a first fitting part, which is fixedly connected to a structure of the seat part, and a second fitting part, which is rotatable in relation to the first fitting part, and which is fixedly connected to a structure of the back part. The first fitting part being both positively connected and also non-positively connected or materially bonded to the structure of the seat part, and/or the second fitting part being both positively connected and also non-positively connected or materially bonded to the structure of the back part.

16 Claims, 2 Drawing Sheets

U.S. PATENT DOCUMENTS

| | | | | |
|---|---|---|---|---|
| 5,310,030 | A | * | 5/1994 | Kawakita et al. .............. 188/371 |
| 6,761,412 | B1 | * | 7/2004 | Garnweidner et al. .. 297/452.18 |
| 6,767,067 | B2 | * | 7/2004 | Fourrey et al. ........... 297/452.18 |
| 7,131,697 | B2 | | 11/2006 | Beermann et al. |
| 7,832,806 | B2 | | 11/2010 | Yamada |
| 2006/0082208 | A1 | | 4/2006 | Beermann et al. |

FOREIGN PATENT DOCUMENTS

| | | | |
|---|---|---|---|
| DE | 2346125 | A1 | 3/1975 |
| DE | 2642941 | A1 | 3/1978 |
| DE | 3904769 | C2 | 8/1990 |
| DE | 10327639 | A1 | 1/2005 |
| EP | 1749692 | A2 | 2/2007 |
| WO | 2008074964 | A1 | 6/2008 |

OTHER PUBLICATIONS

International Searching Authority, International Search Report for Application No. PCT/EP2008/008065, dated Nov. 26, 2008.

* cited by examiner

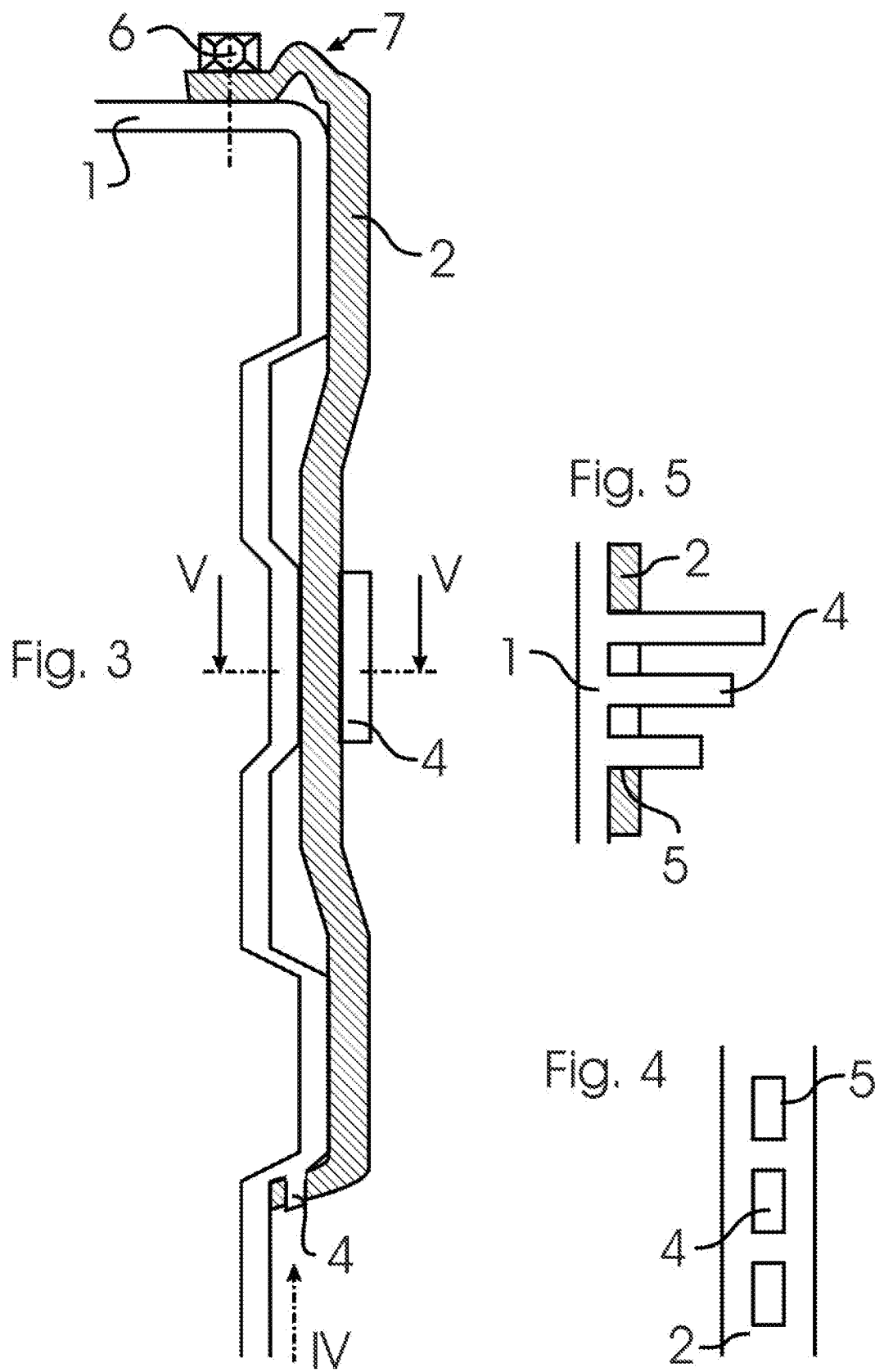

VEHICLE SEAT HAVING A ROTATABLE BACK PART

CROSS-REFERENCE TO RELATED APPLICATIONS

This application is a U.S. National-Stage entry under 35 U.S.C. §371 based on International Application No. PCT/EP2008/008065, filed Sep. 24, 2008, which was published under PCT Article 21(2) and which claims priority to German Application No. 102007050091.4, filed Oct. 19, 2007, which are all hereby incorporated in their entirety by reference.

TECHNICAL FIELD

The present invention relates to a vehicle seat, in particular for a passenger automobile, having a seat part, a back part connected thereto so it is rotatable, and a fitting for adjusting the angle between seat and back parts.

BACKGROUND

In typical vehicle seats, in which seat and back parts each have a metal frame, both frames carrying a cushion covered with a material or leather cover, a fitting for adjusting the angle between seat and back parts can be integrated in a simple and stable manner in the metal frame, in that fitting parts which are pivotable in relation to one another are implemented integrally with the metal frame or are non-positively or positively connected thereto, for example, screwed or soldered. A dissipation of impact energy, as is exchanged between seat occupant and vehicle seat during a crash, hardly occurs here.

For so-called shell seats, whose seat and back parts each have a rigid plastic shell, DE-OS 2 001 842 proposes a fitting, which comprises a spar fastened on the back shell and a plate fastened on the seat shell, having a link guide, in which a joint pin of the spar is movable, an adjuster articulated with the spar and the plate allowing an adjustment of the angle between seat and back shells. DE-OS 2 001 842 does not describe the fastening of the fitting on the plastic shells.

For this purpose, DE 103 27 639 A1 proposes screwing the parts of the fitting onto flat side parts of the seat and back shells, inlay parts made of metal or hard plastic being able to be provided to avoid cracking in the area of the fastening areas.

However, such a vehicle, in which first and second fitting parts are each only fastened non-positively by screws to a structure of the seat or back part in the form of a plastic shell, has disadvantages. In particular in the event of a screw connection alone in only one fastening direction, as is proposed in DE 103 27 639 A1, the danger exists that the screws will loosen or tear out of the soft plastic shells, which requires the complex reinforcement of the plastic shells according to the teaching of DE 103 27 639 A1. In addition, impact energy can hardly be dissipated in this manner.

At least one object of the present invention is therefore to provide a vehicle seat, in particular a shell seat, in which the adjustment mechanism for the angle between seat and back parts is implemented more reliably. In addition, other objects, desirable features, and characteristics will become apparent from the subsequent summary and detailed description, and the appended claims, taken in conjunction with the accompanying drawings and this background.

SUMMARY

A vehicle seat according to an embodiment of the invention comprises a seat part and a back part which is connected thereto so it is rotatable around a seat transverse axis, which is preferably oriented parallel to a vehicle transverse axis. To adjust the rotational angle between seat and back parts, a fitting having first and second fitting parts is provided, a rotational angle of the first fitting part to the second fitting part being able to be adjusted in a way known per se. For example, the first and second fitting parts may be connected via a spindle mechanism, a detent mechanism, a clamping mechanism, or the like for this purpose.

Both seat part and also back part each have a structure. It may be implemented as a frame, in particular made of metal. However, the structure of at least the seat or back part is particularly preferably implemented as a shell, preferably as a contoured shell, in particular having raised or extended lateral edges. Such shells may preferably be produced from one or more plastics, metal parts also being able to be integrated for reinforcement, for example. A vehicle seat according to an embodiment of the invention can thus have a back shell combined with a typical frame-supported seat part or a seat shell connected to a typical frame-supported back part. The vehicle seat is particularly preferably implemented completely as a shell seat, however, both the structure of the seat part and also the structure of the back part being implemented as preferably contoured shells, in particular made of plastic.

According to one embodiment of the present invention, at least the first or the second fitting part is both positively connected and also non-positively connected or materially bonded to the structure of the seat or back part. If seat and back parts are implemented as shell parts, both the first fitting part on the seat shell and also the second fitting part on the back shell can advantageously be both positively fastened and also non-positively fastened or can be materially bonded. However, for example, a back shell, on which the associated fitting part is both positively fastened and also non-positively fastened or materially bonded, can similarly be connected to a seat part having a typical frame structure, in which the other fitting part is integrated or is exclusively non-positively fastened or is materially bonded. This advantageously allows seat or back shells to be combined with typical frame-supported back or seat parts and standardized mass-produced products to be used as the fitting advantageously at the same time.

Through the combination of two different types of fastening, namely a positive connection with a non-positive connection or a material bond, the fitting can be fastened particularly reliably on the seat or back part. In particular, a positive connection can absorb a part of the forces acting on the fitting and thus relieve the non-positive connection or material bond. The positive connection can also make the installation of the fitting on the seat or back part easier, in that correct positioning of structure and fitting part to one another results automatically because of the positive connection. A further advantage is that through the positive connection, in particular an embodiment explained in greater detail hereafter having deformable ribs, projections, and/or beads, impact energy can be dissipated in the connection area between fitting part and structure.

In particular, seat components made of different materials may also be reliably connected to one another by the combination according to an embodiment of the invention of different types of connections. While the structure of the seat and/or back parts can be implemented as described above, preferably as plastic shells, in order to save weight and increase the rigidity of the vehicle seat, it is advantageous to produce the first and/or fitting parts from metal, in order to implement the angle adjustment between the two fitting parts as robust, in particular free of fatigue, relaxation, and creep.

The non-positive connection of a fitting part to a structure can similarly be implemented as removable, in particular via one or more screws, or permanent, for example, by one or more rivets. A positive connection, in contrast, can similarly be implemented by gluing a fitting part to a structure and/or at least partially embedding the fitting part in the structure. While a removable non-positive connection, in particular by screws, has the advantage of readjustment and uninstallation capabilities, a permanent non-positive connection or material bond reduces the risk of loosening of the connection. In order to combine both advantages, the types of fastening listed may also be combined with one another.

In a preferred embodiment, a fitting part is non-positively connected or materially bonded to the associated structure in at least two different planes. Thus, if fitting part and structure are screwed onto one another, for example, the longitudinal axes of at least two screws enclose an angle not equal to approximately 0° with one another. The longitudinal axes of screws may preferably enclose an angle of essentially 90° with one another. In contrast, if the fitting part is materially bonded by gluing to the structure, the connection may be implemented in at least two different planes by two glued surfaces, which enclose an angle not equal to approximately 0°, preferably essentially equal to approximately 90° with one another.

A particularly reliable connection can be achieved by the non-positive connection or material bond in at least two different planes, in which the individual non-positive connection or material bond is advantageously primarily strained in its preferential direction. For example, a rather unfavorable shearing strain of screw, rivet, or glued connections can thus be reduced.

For the positive connection, one fitting part can at least partially encompass the associated structure, in particular in a U-shape. In this way, large contact surfaces are advantageously used, so that forces are relayed via large areas having correspondingly low tension. In particular if the structure is implemented as a frame or shell, associated fitting parts may advantageously be situated laterally thereon and may partially encompass the lateral edges of the structure.

Additionally or alternatively, a centering unit can be provided for the positive connection between fitting part and structure, which comprises a recess in either the fitting part or the structure and a projection, which is particularly complementary to the recess, in the other of the fitting part or the structure, which engages in the recess. Projections and recesses which are complementary to one another are particularly understood as pairs of projections and recesses, whose contours or envelope curves essentially correspond. Projections and recesses may be provided both in the fitting part and also the structure, so that both fitting part and also structure each have one or more recesses and one or more projections. Such centering units not only make installation easier, but rather also relieve the additional non-positive connection or material bond.

As also with the material bond or non-positive connection, it can be advantageous to also situate at least one centering unit in each of at least two different planes. The insertion directions of at least two projections into the associated recesses, which may particularly correspond with longitudinal directions of the projections, thus enclose an angle different from approximately 0°, which is preferably essentially 90°, with one another. The force components acting in the two different planes are advantageously essentially received positively by projections situated in the particular other plane.

In particular if the structure of the seat and/or back part is implemented as a preferably contoured shell, it is advantageous to at least partially cover the shell using a cover, which can comprise fabric or leather, for example. This cover protects the shell, improves the visual appearance of the vehicle seat, and increases its haptic comfort.

For this purpose, it can be advantageous to at least partially enclose the structure using a foam, in order to further contour the vehicle seat or deliberately cushion it. Such a seat and/or back part can advantageously also be covered using a cover made of fabric and/or leather.

The first fitting part, the second fitting part, the structure of the seat part, and/or the structure of the back part may each have one or more beads. In particular with shells made of plastic, but also with fitting parts made of metal, beads situated in accordance with the occurring strains may advantageously increase the rigidity of the particular component. Such beads may similarly deliberately control an elastic or plastic deformation of the particular component and thus actively absorb impact energy. During an impact, the forces acting on seat and/or back parts and the fitting parts connected thereto are partially dissipated with deformation of the beads, so that the forces acting on a vehicle occupant are advantageously reduced.

For dissipation of impact energy, in a preferred embodiment, deformation structures, in particular the beads or other projections explained above, may be implemented in connection areas between the structure of the seat part and the first fitting part and/or between the structure of the back part and the second fitting part, in such a manner that they elastically and/or plastically deform or break off in case of a crash. A part of the impact energy can advantageously be dissipated between fitting part and structure in this way. Both positive connection and also non-positive connection or material bonding of the fitting part to the structure are advantageous for this purpose, but are not absolutely necessary.

BRIEF DESCRIPTION OF THE DRAWINGS

The present invention will hereinafter be described in conjunction with the following drawing figures, wherein like numerals denote like elements, and:

FIG. 3 shows a partial section along section line III-III in FIG. 1;

FIG. 4 shows a detail in the viewing direction indicated by arrow IV in FIG. 3; and FIG. 5 shows a detail section along section line V-V in FIG. 3.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
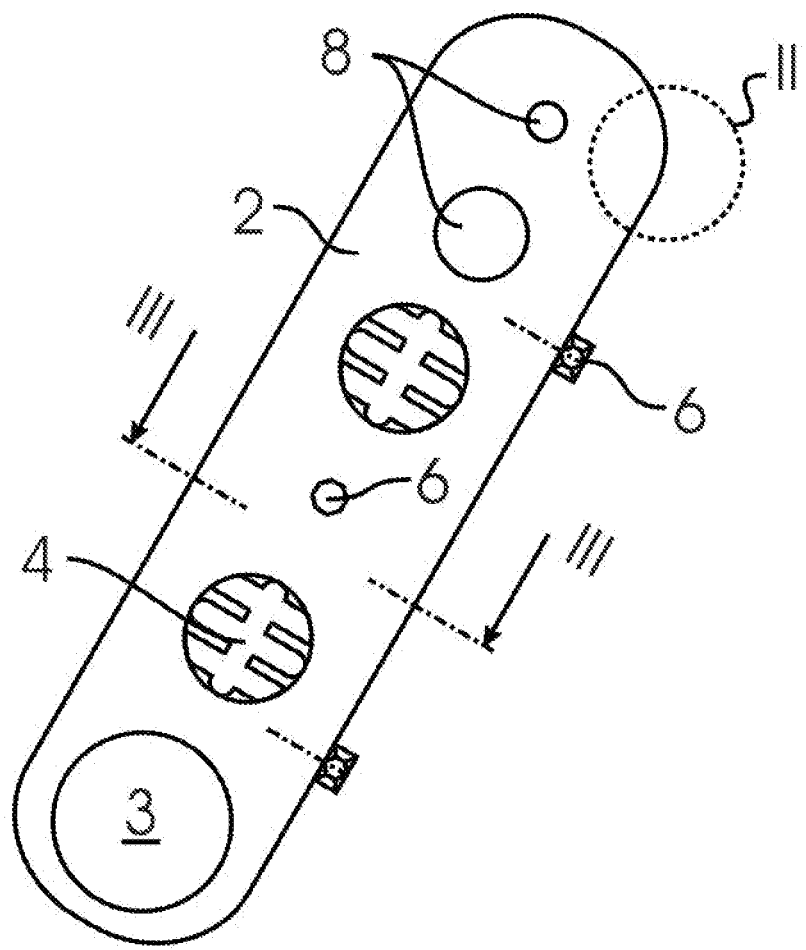
FIG. 1 shows a back part having second fitting part fastened thereon of a vehicle seat according to one embodiment of the present invention from the side.

A back part of a vehicle seat having second fitting part 2 fastened thereon is shown in a top view in FIG. 1, which essentially covers the back part in the side view according to FIG. 1, i.e., viewed in the vehicle transverse direction. The back part comprises a structure in the form of a plastic shell 1 (cf. FIG. 3), which is upholstered using foam (not shown for clarity) and is covered by a fabric cover (also not shown). The fabric cover also encloses the second fitting part 2.

The second fitting part 2 is connected in a way known per se (therefore not shown) via an adjustment mechanism 3 to a first fitting part, which is in turn fastened on a seat part, which comprises a plastic shell (not shown) covered with a fabric cover and cushioned with foam. The construction and fastening of the seat part and the first fitting part essentially correspond to the construction explained in greater detail hereafter and the fastening of the back part and second fitting part 2, so that a corresponding illustration and explanation are dispensed with. The adjustment mechanism 3 (not shown) is implemented in a way known per se and allows a setting of the angle between seat and back parts by rotating an externally accessible screw (not shown).

As is obvious from FIG. 3 in particular, the second fitting part 2 has an essentially U-shaped cross-section, which positively encompasses an edge area of the shell 1 of the back part. To make installation easier and to increase the positive connection, centering units are provided in each case in a first plane (left-right in FIG. 3; top view according to FIG. 4) and a second plane perpendicular thereto (top-bottom in FIG. 3; section in this plane according to FIG. 5). For this purpose, the plastic shell 1 has projections 4 protruding out of the first and/or second plane, which positively engage in corresponding recesses 5 in the second fitting part 2. As is recognizable in particular from FIG. 1, FIG. 4, the projections 4 protruding out of the plane of the drawing of FIG. 4 have a rectangular cross-section, while the projections 4 protruding out of the plane of the drawing of FIG. 1 have an essentially circular contour. These projections 4 are implemented as ribbed, as shown by FIG. 1, FIG. 5, in order to allow high rigidity and in particular energy absorption at low weight. For this purpose, the projections 4 may particularly be dimensioned so that they plastically deform or break off in the event of an impact.

After the second fitting part 2 is fastened centered and positively on the shell 1 by insertion of the projections 4 into the recesses 5, it is additionally removably non-positively fastened on the shell 1 by screws 6. For this purpose, the screws 6, which penetrate screw holes in the second fitting part 2, are screwed into metal inlays, which are integrated in the shell 1 (not shown) during the original molding by extrusion coating using plastic compound.

As is obvious in FIG. 1 in particular, the screw axes of various fastening screws 6 are offset by approximately 90° to one another, so that the U-shaped second fitting part 2 is screwed on both in the seat longitudinal direction (left-right in FIG. 1) and also in the seat transverse direction (top view of FIG. 1).

Figure 2:
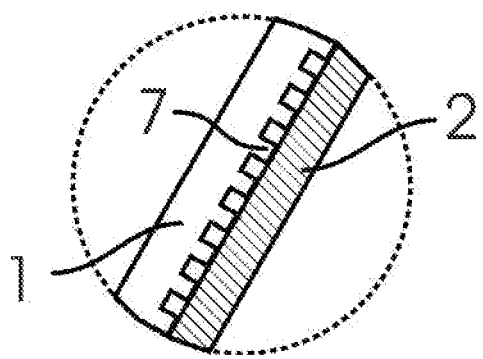
FIG. 2 shows a detail section in area II in FIG. 1.

As is recognizable in particular in FIG. 3 and the detail enlargements of FIG. 2, FIG. 4, FIG. 5, diverse beads 7 and/or projections 4 are provided in the connection area between the second fitting part 2 and the shell 1 in order to stiffen the seat components, on the one hand.

On the other hand, these beads 7 and/or projections 4 allow the targeted dissipation of impact energy by plastic deformation of the beads 7 and/or projections 4. As FIG. 2 shows, the term "bead" in the meaning of the present invention includes, in addition to projections formed by folding or material thickening (cf. FIG. 3), in particular also projections or ribs which are defined by adjoining grooves (cf. FIG. 2, FIG. 5). Impact energy is actively absorbed and dissipated by such projections and/or beads 7: The projections 7 shown in FIG. 2 between structure 1 and fitting part 2 may thus plastically deform and even break with energy absorption. Similarly, the bead 7 of the fitting part 2 shown in FIG. 3 can plastically deform with energy absorption. The ribs of the projections 4 (cf. FIG. 5) and/or the individual, appropriately dimensioned ribs 4 (cf. FIG. 4) may also be deformed or break while dissipating energy. Impact energy can thus be dissipated between fitting part 2 and structure 1 by plastic or destructive deformation of these deformation structures 4, 7.

Openings in the second fitting part 2, which allow an attachment of a side airbag (not shown), are designated by 8 in FIG. 1.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A vehicle seat, comprising:
a seat part;
a back part connected to the seat part and rotatable; and
a fitting adapted to adjust an angle between the seat part and the back part, the fitting comprising a first fitting part that is fixedly connected to a structure of the seat part, the structure of the seat part having a shell, and a second fitting part that is rotatable relative to the first fitting part and fixedly connected to a structure of the back part;
wherein at least one of the first fitting part or the second fitting part is both positively connected and also non-positively connected to the structure of the seat part,
wherein the back part includes a plurality of deformable projections that engage a respective recess of a plurality of recesses formed through the second fitting part to positively connect the second fitting part to the back part and a plurality of deformable beads that are formed on the second fitting part in a connection area between the second fitting part and the back part, and
wherein the first fitting part is produced from a metal, has a substantially U-shaped cross-section to encompass an edge area of the shell of the seat part and includes at least one side airbag attachment opening.

2. The vehicle seat according to claim 1, wherein the first fitting part is removably non-positively connected to the structure.

3. The vehicle seat according to claim 1, wherein the first fitting part is permanently non-positively connected to the structure.

4. The vehicle seat according to claim 1, wherein the first fitting part is non-positively connected to the structure in at least two different planes.

5. The vehicle seat according to claim 1, wherein the second fitting part at least partially positively encompasses the structure.

6. The vehicle seat according to claim 1, wherein a centering unit is situated at the center of the first fitting part and the structure and comprises at least one recess defined in the first fitting part and at least one projection that extends from the structure that engages in the at least one recess.

7. The vehicle seat according to claim 6, further comprising at least one centering unit is situated in at least two different planes.

8. The vehicle seat according to claim 1, wherein the structure is at least partially covered with a cover.

9. The vehicle seat according to claim 1, wherein the structure is at least partially enclosed by a foam.

10. The vehicle seat according to claim 9, wherein the foam is at least partially covered with a cover.

11. The vehicle seat according to claim 1, wherein the second fitting part is implemented integrally with the structure.

12. The vehicle seat according to claim 1, wherein the structure has beads.

13. The vehicle seat according to claim 1, wherein a deformation structure is implemented in at least one connection area between the structure and the first fitting part.

14. A vehicle seat, comprising:

a seat part;

a back part connected to the seat part and rotatable; and a fitting adapted to adjust an angle between the seat part and the back part, the fitting comprising a first fitting part that is fixedly connected to a structure of the seat part, and a second fitting part that is rotatable relative to the first fitting part and fixedly connected to a structure of the back part, the structure of the back part having a shell;

wherein at least one of the first fitting part or the second fitting part is both positively connected and also non-positively connected to the structure of the seat part, wherein the back part includes a plurality of deformable projections that engage a respective recess of a plurality of recesses formed through the second fitting part to positively connect the second fitting part to the back part and a plurality of deformable beads that are formed on the second fitting part in a connection area between the second fitting part and the back part, and wherein the second fitting part is produced from a metal, has a substantially U-shaped cross-section to encompass an edge area of the shell of the back part and includes at least one side airbag attachment opening.

15. The vehicle seat according to claim 14, wherein the second fitting part is removably non-positively connected to the structure.

16. The vehicle seat according to claim 14, wherein the second fitting part is permanently non-positively connected to the structure.

* * * * *